(12) United States Patent
Henning et al.

(10) Patent No.: US 7,529,980 B2
(45) Date of Patent: May 5, 2009

(54) METHOD AND APPARATUS FOR INJECTING ERRORS INTO SAS DOMAINS THROUGH SAS EXPANDERS

(75) Inventors: Brett Henning, Colorado Springs, CO (US); Scott Dominguez, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 429 days.

(21) Appl. No.: 11/360,103

(22) Filed: Feb. 23, 2006

(65) Prior Publication Data

US 2007/0220176 A1 Sep. 20, 2007

(51) Int. Cl.
*G06F 11/00* (2006.01)
(52) U.S. Cl. .............. 714/41; 714/25; 714/32; 714/43
(58) Field of Classification Search ............. 714/25, 714/27, 32, 33, 37, 41, 42, 43, 44, 56
See application file for complete search history.

(56) References Cited

U.S. PATENT DOCUMENTS 5,072,447 A * 12/1991 Perloff et al. ............... 714/32
2005/0005178 A1   1/2005 Bashford et al. ............ 713/300
2005/0028044 A1 * 2/2005 Paulsen et al. .............. 714/43
2005/0080881 A1   4/2005 Voorhees et al. ............ 709/220
2005/0193178 A1   9/2005 Voorhees et al. ............ 711/149
2005/0204197 A1   9/2005 Uddenberg et al. .......... 714/33
2006/0101171 A1 * 5/2006 Grieff et al. ................ 710/36
2007/0073909 A1 * 3/2007 Gasser ....................... 710/8
2008/0010530 A1 * 1/2008 Davies et al. ............... 714/31

* cited by examiner

*Primary Examiner*—Robert Beausoliel
*Assistant Examiner*—Joseph D Manoskey
(74) *Attorney, Agent, or Firm*—Ortiz & Lopez PLLC

(57) ABSTRACT

A data-processing apparatus, method and program product generally include identifying one or more SAS expanders and one or more link thereof associated with an SAS domain of a data-processing apparatus. Link and reset data can be automatically injected onto the link(s) and the SAS expander(s) associated with the SAS domain, in response to identifying the SAS expander(s) and one or more links thereof. The presence of the link(s) within the SAS domain can then be verified, in response to automatically injecting the link and reset data onto one or more links and one or more SAS expanders in order to test the links and the SAS expanders associated with the SAS domain.

20 Claims, 3 Drawing Sheets

METHOD AND APPARATUS FOR INJECTING ERRORS INTO SAS DOMAINS THROUGH SAS EXPANDERS

TECHNICAL FIELD

Embodiments are generally related to data-processing methods and systems. Embodiments are additionally related to Input/Output (I/O) control methods and systems. Embodiments are particularly directed to I/O interface devices and components, such as, for example, Serial Attached SCSI (SAS) devices.

BACKGROUND OF THE INVENTION

In a conventional data-processing system, such as a computer and/or a computer network, one or more processors may communicate with input/output (I/O) devices over one or more buses. The I/O devices may be coupled to the processors through an I/O interface such as an I/O bridge, which can manage the transfer of information between a peripheral bus connected to the I/O devices and a shared bus connected to the processors. Additionally, the I/O interface may manage the transfer of information between system memory and the I/O devices or the system memory and the processors.

An I/O interface can also be utilized to transfer information between I/O devices and main storage components of a host processor. An I/O channel, for example, may connect the host directly to a mass storage device (e.g., disk or tape drive). In the case of a mainframe host processor, the channel is usually coupled to one or more device controllers. Each device controller can in turn be connected to a plurality of mass storage devices.

Small Computer Systems Interface ("SCSI") is a set of American National Standards Institute ("ANSI") standard electronic interface specification that allows, for example, computers to communicate with peripheral hardware. Common SCSI compatible peripheral devices may include: disk drives, tape drives, Compact Disc-Read Only Memory ("CD-ROM") drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets via one or more SAS expander devices. In general, as is common in all SCSI communications, SAS initiators initiate communications with SAS targets. The expander devices expand the number of ports of a SAS network domain used to interconnect SAS initiators and SAS targets (collectively referred to as SAS devices)

One of the problems with current SAS expander devices is that there is minimal testing of SAS expanders in a complete domain aside from testing standard operations. A test is needed to stress the error handling capabilities of the expander itself. It is difficult to test the initiator's link error handling capabilities in an SAS domain when there are expanders present. Because SAS is a relatively new protocol, there are few tests which stress these characteristics. Many of the existing tests, such as stress tests, simply test the ability of an expander to exist in the domain under normal operation. Existing software tests do not test the ability of the SAS expander to recover from repeated severe errors, which are induced in the expander. Such tests also do not test the initiator's ability to handle these errors correctly. Such conditions, however, can occur and should be tested. Current testing techniques require additional hardware to test the domain and are also limited to testing no more than four links at a time, while an SAS domain may possess many more.

BRIEF SUMMARY

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide for improved data-processing methods and systems.

It is another aspect of the present invention to provide for a method and apparatus for injecting errors into SAS domains through SAS expanders for testing purposes.

The above and other aspects of the invention can be achieved as will now be briefly described. A data-processing apparatus, method and program product thereof are disclosed, which, generally includes identifying one or more SAS expanders and one or more link thereof associated with an SAS domain of a data-processing apparatus. Link and reset data can be automatically injected onto the link(s) and the SAS expander(s) associated with the SAS domain, in response to identifying the SAS expander(s) and one or more links thereof. The presence of the link(s) within the SAS domain can then be verified, in response to automatically injecting the link and reset data onto one or more links and one or more SAS expanders in order to test the links and the SAS expanders associated with the SAS domain.

The embodiments relate to a test application that injects hard resets on various links. Using an SAS SMP Phy Control request, the methodology injects link resets and hard resets onto various links in the SAS domain. These requests are generated on a specified time interval, and target random phys. The resets can be sent to one or more links, and can be sent to one or more SAS expanders. After a specified time interval, the test application can take steps to verify that the link has recovered. Such a methodology can include sending a command over the link to a target, issuing an SMP Report Phy Error Log request to the phy under test, issuing an SMP Report Phy SATA request to the phy under test, and comparing the results of SMP Report Route Information requests for the phy under test from before and after the test.

BRIEF DESCRIPTION OF THE DRAWINGS

The accompanying figures, in which like reference numerals refer to identical or functionally similar elements throughout the separate views and which are incorporated in and form part of the specification, further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
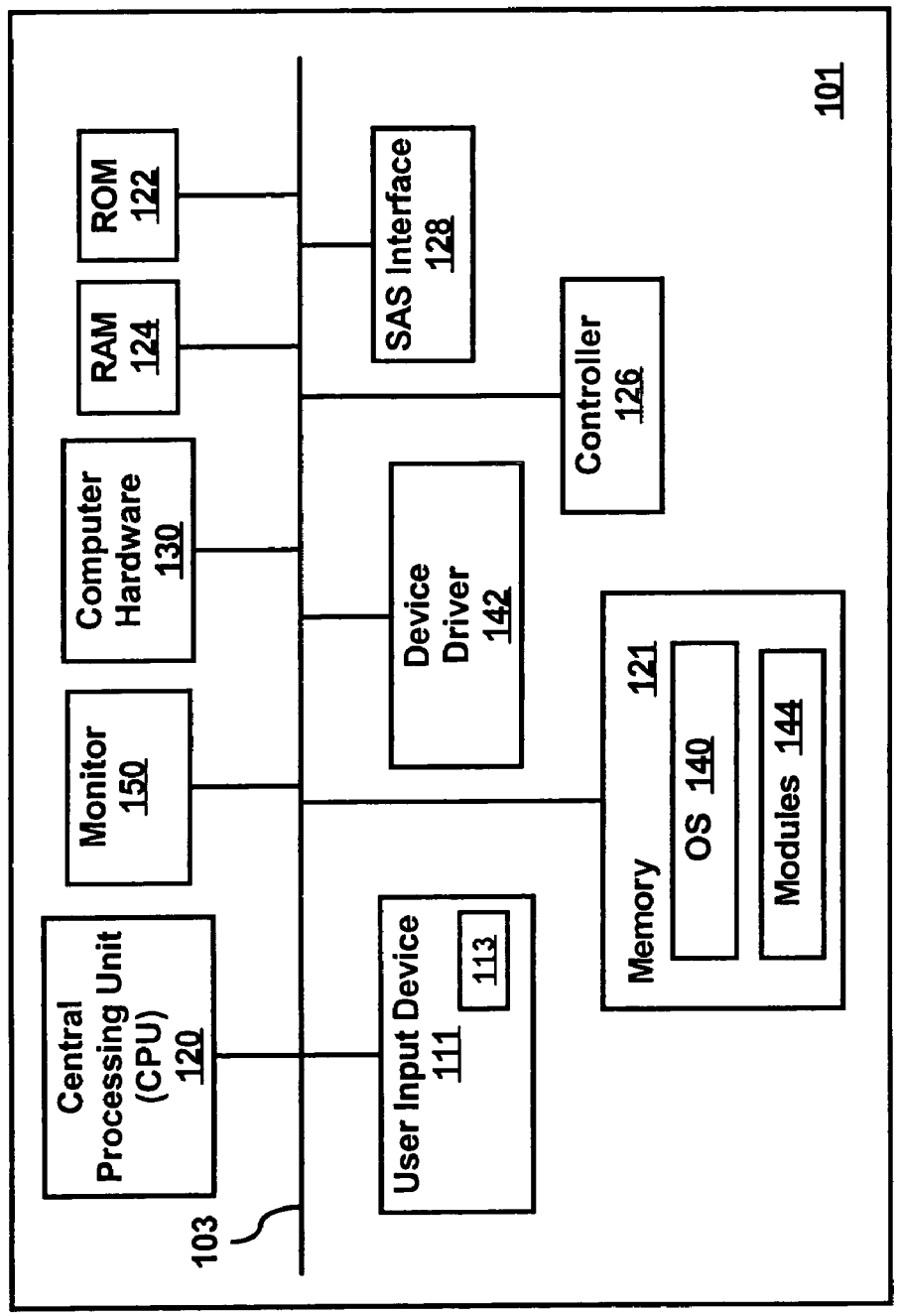
FIG. 1 illustrates a block diagram of a system in which a preferred embodiment of the present invention can be implemented.

For a further understanding of the present invention, reference is made to FIG. 1, which depicts a data-processing apparatus 101 in which an embodiment can be implemented. Data processing apparatus 101 of FIG. 1 generally includes a user input device 111, a central processing unit 120, computer hardware 130, and a monitor 150. The user input device 111 can be coupled to the central processing unit 120 wherein the central processing unit 120 is coupled to the computer hardware 130 and the operating system 140. User input device 111 can be implemented, for example, as a computer keyboard, a computer mouse, and so forth.

The central processing unit 120 is connected to a bus 103, which in turn can be connected to other system components, such as memory 121, Random Access Memory (RAM) 124, Read Only Memory (ROM) 124, a controller 126, and an SAS interface 128. Note that controller 126 can be implemented as one or more controller types. For example, controller 136 can be configured as Small Computer Systems Interface (SCSI) controller and/or other types of controllers. For illustrative and explanatory purposes, however, controller 126 can be considered to be a Small Computer Systems Interface (SCSI) controller.

System bus 103 can also be connected to other components of data processing apparatus 101, such as, for example, monitor 150, device driver 142 and user input device 111. The SAS interface 128 is generally associated with operating system 140. Note that device driver 142 can be implemented as an SCSI device driver, depending upon design considerations. Memory 121, which is coupled to bus 103, can communicate with the central processing unit 120 via bus 103. Operating system (OS) 140 can be stored within memory 121 and processed via CPU 120. A software module 144 can also be stored within memory 121. Note the term "module" is defined in greater detail herein.

The device driver 142 can be implemented as a software or instruction module stored in a memory, such as memory 121, which can be utilized to communicate with the controller 126. Thus, although device driver 142 is illustrated in FIG. 1 as a separate "block," it can be appreciated that device driver 142 can be implemented in the context of a module storable in a computer memory. Device driver 142 generally functions as a module or group of modules that communicates between OS 140 and the controllers described herein. Similarly, SAS interface 128, which is also depicted in FIG. 1 as constituting a separate "block", can form a part of OS 140 to allow for direct communication such as sending messages to and from device driver 142.

The operating system 140 is the master control program that runs the computer. It sets the standards for all application programs that run in the computer. Operating system 140 can be implemented as the software that controls the allocation and usage of hardware resources, such as memory 121, central processing unit 120, disk space, and other peripheral devices, such as monitor 150, user input device 111 and computer hardware 130. Examples of operating systems, which may be utilized to implement operating system 140 of apparatus 101, include Windows, Mac OS, UNIX and Linux.

Bus 103 can be implemented as a plurality of conducting hardware lines for data transfer among the various system components to which bus 103 is attached. Bus 103 functions as a shared resource that connects varying portions of data-processing apparatus 101, including the CPU 120 (i.e., a microprocessor), controllers, memory and input/output ports and so forth and enabling the transfer of information. Bus 103 can be configured into particular bus components for carrying particular types of information. For example, bus 103 can be implemented to include a group of conducting hardware lines for carrying memory addresses or memory locations where data items can be found, while another group of conducting hardware lines can be dedicated to carrying control signals, and the like.

The user input device 111 can include a plurality of device descriptor files 112. The device descriptor files 113 contain information related to the user input device, e.g. what type of device it is, who made the device, etc. The device descriptor files 113 can also contain user-defined fields called report descriptors. Report descriptors are strings of information that the operating system 140 can read. Report descriptors can be implemented, for example, as for passing useful information about the user input device 111 to the operating system 140 and/or a device driver 142. Such report descriptors are unique for each type of user input device.

Figure 2:
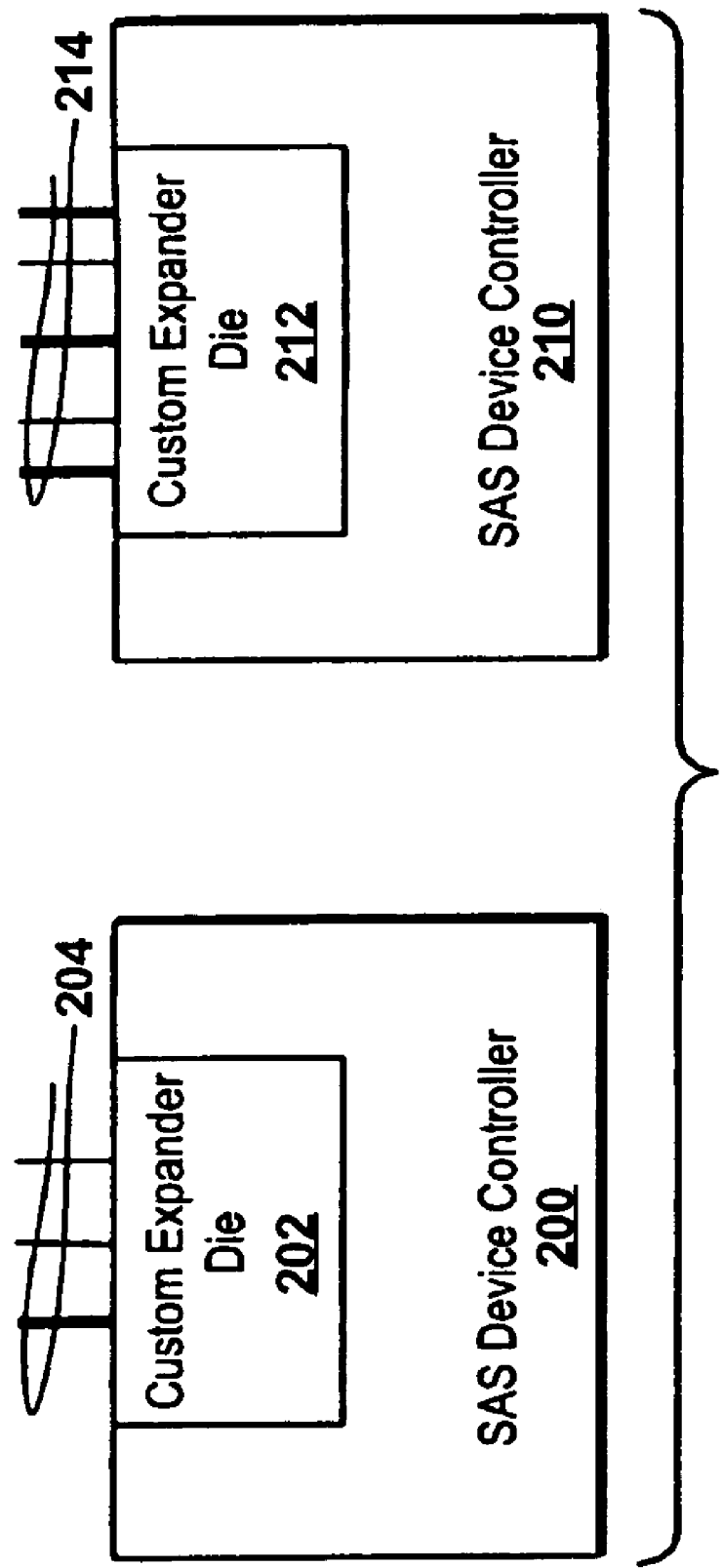
FIG. 2 illustrates an SAS expander having an integral custom expander circuit die embedded within, which can be adapted for use in accordance with an embodiment.

FIG. 2 illustrates an SAS expander 200 having an integral custom expander circuit die 202 embedded within, which can be adapted for use in accordance with an embodiment. Custom expander circuit die 202 is designed by an appropriate engineer to provide, for example, three ports adapted for coupling to SAS devices outside SAS expander 200. Ports 204 are exemplified by two thinner lines representing standard ports and one thicker line representing a wide port configuration as generally known in the SAS specifications. SAS device controller 210 is a similar SAS controller including a custom expander circuit die 212 providing external ports 214—two standard ports represented by thinner lines and three wide ports represented by thicker lines.

The SAS expander 200 depicted in FIG. 2 can be implemented in accordance with the system 100 depicted in FIG. 1. That is, system 100 can be modified to function in accordance with the SAS expander 200 depicted in FIG. 1. Note that the controller 126 depicted in FIG. 1 can be implemented as the SAS device controller 210 depicted in FIG. 2. Similarly, the SAS expander 200 can be implemented in place of or in association with the SAS interface 128 depicted in FIG. 1.

Note that embodiments of the present invention can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media. An example of such a module is module 144 stored within memory 121, as depicted in FIG. 1. Note that the OS 140 depicted in FIG. 1 can also be implemented as a software module or group of modules, depending upon design considerations.

Figure 3:
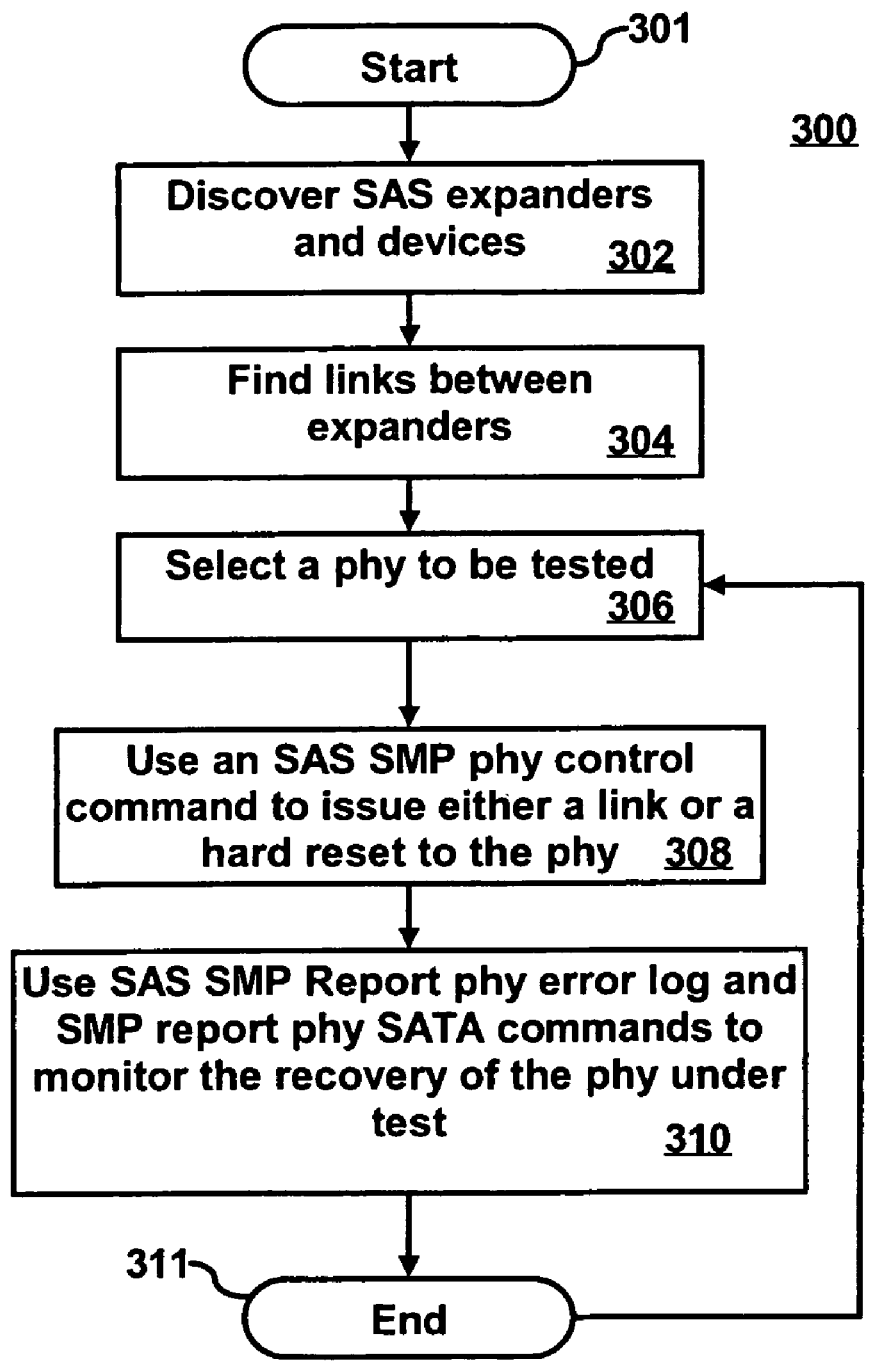
FIG. 3 illustrates a high-level flow chart of operations depicting logical operational steps that can be implemented in accordance with a preferred embodiment.

The methodology depicted in FIG. 3, for example, can be implemented as one or more such modules. Such modules can be referred to also as "instruction modules" and may be stored within a memory of a data-processing system such as memory 121 of FIG. 1. Modules 144 depicted in FIG. 1 represent such instruction modules. Such instruction modules may be implemented in the context of a resulting program product (i.e., program "code"). Note that the term module and code can be utilized interchangeably herein to refer to the same device or media.

FIG. 3 illustrates a high-level flow chart 300 of operations depicting logical operational steps that can be implemented in accordance with a preferred embodiment. The process can be initiated as indicated at block 301. As depicted next at block 302, an operation can be processed in which a search is performed for one or more SAS expanders, such as, for example, SAS expander 128 depicted in FIG. 1 and associated devices. Thereafter, as illustrated at block 304, a search is performed to find one or more links between such SAS expanders. Next, as depicted at block 306, an operation is processed in which a phy is selected for testing. Note that as utilized herein the term "phy" can refer to a physical layer or physical layer device. Thereafter, as depicted at block 308, an SAS SMP phy control command is utilized to issue either a link reset or a hard reset to the phy. Next, as illustrated at block 310, an SAS SMP report phy error log and an SMP report phy SATA command is utilized to monitor the recovery of the phy under test. Following processing of the operation depicted at block 310, the operation described at block 306 can be repeated, followed by the operation depicted at block 308 and so forth. The process can finally terminate as illustrated at block 311.

The process depicted in FIG. 3 can be utilized to implement a test application that injects hard resets on various links. Using the SAS SMP Phy Control request, as indicated at blocks 308 and 310, link resets and hard resets can be injected onto various links in the SAS domain. These requests can be generated on a specified time interval, and target random phys. The resets can be sent to one or more links, and can be sent to more SAS expanders. After a specified time interval, the test application can take steps to verify that the link has recovered. This can include sending a command over the link to a target issuing an SMP Report Phy Error Log request as indicated at block 310 to the phy under test, issuing an SMP Report Phy SATA request to the phy under test, and comparing the results of the SMP Report Route information requests for the phy under test from prior to and after the test.

The process depicted in FIG. 3 offers a number of important features. For example, the operation can inject errors in SAS domains that contain one or more expanders. Such a testing procedure does not require additional hardware, and errors can be injected on random phys and/or random SAS expanders, or on specific phys as selected by the user. The process illustrated in FIG. 3 can also be utilized to verify link recovery to ensure that the entire discovery sequence has completed without an error.

The methodology illustrated in FIG. 3 also offers a number of advantages. First, such a methodology does not require additional hardware. Second, such a process can run while other tests are also running, providing error injection while other tests are stressing other SAS attributes. Third, the process depicted in FIG. 3 can check the completion status of the test. Finally, fourth, such a procedure can run in interactive and automated modes, offering additional user efficiency. Note that the embodiments disclosed herein can be constructed as a stand-alone application or embedded into another application, depending upon design considerations. Additionally, embodiments can be utilized to test and evaluate competitive expander products.

The process depicted in FIG. 3 can be implemented a module or group of modules, such as module 144 depicted in FIG. 1. Such modules may be utilized as part of a data-processing apparatus, such as apparatus/system 101 depicted in FIG. 1. Such a system 100 can thus be composed of a module 144 for identifying at least one SAS expander and at least one link thereof associated with an SAS domain of a data-processing apparatus; and/or a module 144 for injecting link and reset data onto one or more links and one or more SAS expanders associated with the SAS domain, in response to identifying one or more of the SAS expanders and one or more links thereof; and/or a module 144 for verifying the presence of the link(s) within the SAS domain, in response to automatically injecting the link and reset onto one or more links and one or more SAS expanders in order to test the link(s) and SAS expander(s) associated with the SAS domain.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A data-processing method, comprising:
   identifying at least one SAS expander and at least one link thereof associated with an SAS domain of a data-processing apparatus;
   automatically injecting link reset and/or hard reset data onto said at least one link and said at least one SAS expander associated with said SAS domain, in response to identifying said at least one SAS expander and said at least one link thereof; and verifying a presence of said at least one link within said SAS domain, in response to automatically injecting said link and reset said onto said at least one link and said at least one SAS expander in order to test at least one link and at least one SAS expander associated with said SAS domain.

2. The method of claim 1 wherein automatically injecting link and reset data further comprises injecting at least one error in said SAS domain, wherein said SAS domain contains said at least one SAS expander.

3. The method of claim 2 further comprising injecting said at least one error onto a random component associated with said SAS domain.

4. The method of claim 1 wherein said at least one SAS expander comprises a randomly selected SAS expander within said SAS domain.

5. The method of claim 1 wherein verifying said presence of said at least one link within said SAS domain furthering comprises verifying a recovery of said at least one link.

6. The method of claim 1 wherein verifying said presence of said at least one link within said SAS domain comprises transferring a command over said at least one link to a target.

7. The method of claim 1 wherein verifying said presence of said at least one link within said SAS domain comprises issuing an error log request to a component associated with said SAS domain, wherein said component is subject to a test.

8. The method of claim 7 wherein verifying said presence of said at least one link within said SAS domain comprises comparing at least one result of a generated SAS report prior to and after a testing of said component.

9. A data-processing system, comprising:
   a module for identifying at least one SAS expander and at least one link thereof associated with an SAS domain of a data-processing apparatus;
   a module for injecting link reset and/or reset data onto said at least one link and said at least one SAS expander associated with said SAS domain, in response to identifying said at least one SAS expander and said at least one link thereof; and
   a module for verifying a presence of said at least one link within said SAS domain, in response to automatically injecting said link and reset said onto said at least one link and said at least one SAS expander in order to test at least one link and at least one SAS expander associated with said SAS domain.

10. The system of claim 9 wherein said module for injecting link and reset data onto said at least one link and said at least one SAS expander associated with said SAS domain further comprises a module for injecting at least one error in said SAS domain, wherein said SAS domain contains said at least one SAS expander.

11. The system of claim 10 wherein said module for injecting link and reset data onto said at least one link and said at least one SAS expander associated with said SAS domain further comprises a module for automatically injecting said at least one error onto a random component associated with said SAS domain.

12. The system of claim 9 wherein said at least one SAS expander comprises a randomly selected SAS expander within said SAS domain.

13. The system of claim 9 wherein said module for verifying said presence of said at least one link within said SAS domain furthering comprises a module for verifying a recovery of said at least one link.

14. The system of claim 9 wherein said module for verifying said presence of said at least one link within said SAS domain comprises a module for transferring a command over said at least one link to a target.

15. The system of claim 9 wherein said module for verifying said presence of said at least one link within said SAS domain further comprises a module for issuing an error log request to a component associated with said SAS domain, wherein said component is subject to a test.

16. The system of claim 15 wherein said module for verifying said presence of said at least one link within said SAS domain further comprises a module for comparing at least one result of a generated SAS report prior to and after a testing of said component.

17. A program product residing in a data-processing apparatus, comprising:
   instruction media residing in a memory of said data-processing apparatus for identifying at least one SAS expander and at least one link thereof associated with an SAS domain of a data-processing apparatus;
   instruction media residing in a memory of said data-processing apparatus for automatically injecting link reset and/or reset data onto said at least one link and said at least one SAS expander associated with said SAS domain, in response to identifying said at least one SAS expander and said at least one link thereof; and
   instruction media residing in a memory of said data-processing apparatus for verifying a presence of said at least one link within said SAS domain, in response to automatically injecting said link and reset said onto said at least one link and said at least one SAS expander in order to test at least one link and at least one SAS expander associated with said SAS domain.

18. The program product of claim 17 wherein said instruction media residing in a memory of said data-processing apparatus for automatically injecting link and reset data further comprises instruction media for injecting at least one error in said SAS domain, wherein said SAS domain contains said at least one SAS expander.

19. The program product of claim 18 further comprising instruction media residing in a memory of said data-processing apparatus for injecting said at least one error onto a random component associated with said SAS domain.

20. The program product of claim 19 wherein said instruction media residing in a memory of said data-processing apparatus for verifying said presence of said at least one link within said SAS domain further comprises instruction media for verifying a recovery of said at least one link.

* * * * *